(12) United States Patent
Scholl et al.

(10) Patent No.: US 11,091,141 B2
(45) Date of Patent: Aug. 17, 2021

(54) MONITORING OF INACTIVE SOLENOID VALVES

(71) Applicant: KNORR-BREMSE SYSTEME FUER NUTZFAHRZEUGE GMBH, Munich (DE)

(72) Inventors: Frank Scholl, Ingersheim (DE); Ping Zhao, Leonberg (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 372 days.

(21) Appl. No.: 16/073,710

(22) PCT Filed: Jan. 24, 2017

(86) PCT No.: PCT/EP2017/051404
§ 371 (c)(1),
(2) Date: Jul. 27, 2018

(87) PCT Pub. No.: WO2017/133923
PCT Pub. Date: Aug. 10, 2017

(65) Prior Publication Data
US 2019/0061729 A1   Feb. 28, 2019

(30) Foreign Application Priority Data

Feb. 1, 2016 (DE) .................. 10 2016 101 700.0

(51) Int. Cl.
*B60T 17/22* (2006.01)
*B60T 8/88* (2006.01)

(52) U.S. Cl.
CPC ............ *B60T 17/221* (2013.01); *B60T 8/885* (2013.01); *B60T 2270/406* (2013.01); *B60T 2270/415* (2013.01)

(58) Field of Classification Search
CPC ........ B60T 8/885; B60T 13/665; B60T 13/74; B60T 13/741; B60T 17/221; B60T 2270/406; B60T 2270/415; B61K 7/08
(Continued)

(56) References Cited

U.S. PATENT DOCUMENTS 3,841,712 A * 10/1974 Syria .................... B60T 8/90
303/122.08
4,340,935 A * 7/1982 Anlauf .................. B60T 8/885
303/122.08
(Continued)

FOREIGN PATENT DOCUMENTS

DE   19529433 A1   2/1997
DE   19826685 A1   5/1999
(Continued)

OTHER PUBLICATIONS

English machined translation of DE-10124109 A1, description (Dec. 12, 2002).*
(Continued)

*Primary Examiner* — Robert A. Siconolfi
*Assistant Examiner* — San M Aung
(74) *Attorney, Agent, or Firm* — Norton Rose Fulbright US LLP; Gerard Messina; Aaron Deditch

(57) ABSTRACT

A method for monitoring a solenoid valve, the method including: applying a test signal on one side of the solenoid valve, the solenoid valve having a control coil for controlling an air pressure in a brake cylinder of an electropneumatic brake, wherein the solenoid valve has a supply voltage side, at which the control coil takes up an electric supply current, and a reference potential side, at which the control coil delivers the electric supply current; tapping a measurement signal on the other side of the solenoid valve; and determining the state of the solenoid valve based on a
(Continued)

juxtaposition of the test signal and of the measurement signal. Also described are a related control apparatus, an electro-pneumatic brake, and a computer readable medium.

15 Claims, 5 Drawing Sheets

(58) Field of Classification Search
USPC .............................................. 303/20, 122.08
See application file for complete search history.

(56) References Cited

U.S. PATENT DOCUMENTS

| | | | | |
|---|---|---|---|---|
| 5,499,866 | A * | 3/1996 | Brugger | B60T 7/12 303/122.08 |
| 6,127,830 | A * | 10/2000 | Engelmann | B60R 16/03 324/713 |
| 2001/0020562 | A1* | 9/2001 | Hackl | B60T 13/741 188/161 |
| 2015/0204931 | A1* | 7/2015 | Scholl | B60T 8/36 324/503 |
| 2015/0336556 | A1* | 11/2015 | Huot-Marchand | B60T 17/221 324/503 |

FOREIGN PATENT DOCUMENTS

| | | |
|---|---|---|
| DE | 10124109 A1 | 12/2002 |
| DE | 102012014800 A1 | 5/2014 |
| EP | 0025913 A2 | 4/1981 |
| EP | 2119610 A1 | 11/2009 |
| WO | 99/26827 A1 | 6/1999 |
| WO | 2001/066397 A1 | 9/2001 |
| WO | 2014/016223 A1 | 1/2014 |

OTHER PUBLICATIONS

English machined translation of DE-10124109 A1, Claims (Dec. 12, 2002).*

English machined translation of EP-0025913 A1, description (Apr. 1, 1981).*

International Search Report dated May 15, 2017, of the corresponding International Application PCT/EP2017/051404 filed Jan. 24, 2017.

* cited by examiner

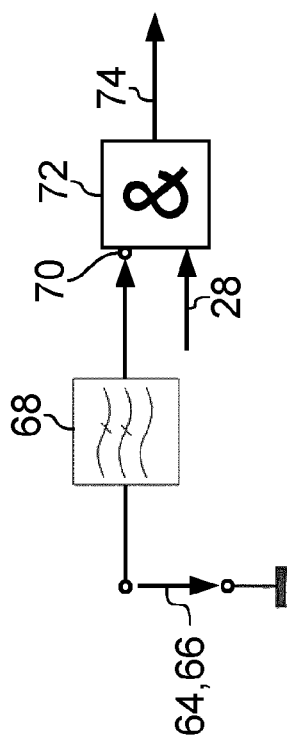
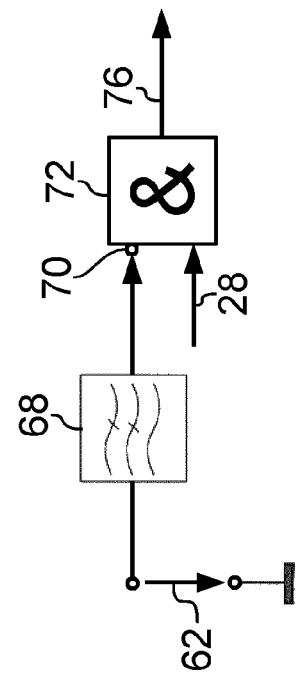
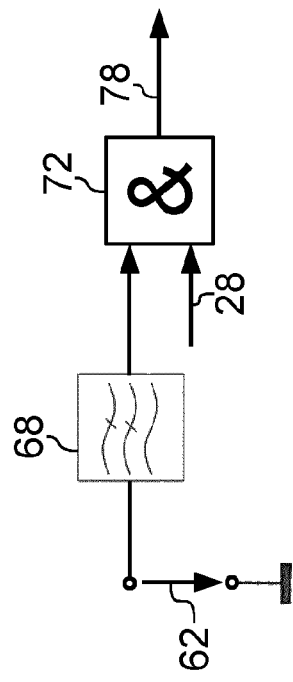

MONITORING OF INACTIVE SOLENOID VALVES

FIELD OF THE INVENTION

The invention relates to a method for monitoring a solenoid valve, comprising a control coil for controlling an air pressure in a brake cylinder of an electro-pneumatic brake, to a control apparatus for carrying out the method and to an electro-pneumatic brake having the control apparatus.

BACKGROUND INFORMATION

A method of this kind is discussed in WO 2001/066 397 A1. In the document, a measurement signal on the supply voltage side of a solenoid valve is tapped to monitor the solenoid valve. The supply voltage side is determined in this case according to a control coil present in the solenoid valve for controlling an air pressure in a brake cylinder of an electro-pneumatic brake, wherein the control coil takes up an electric supply current at the supply voltage side and delivers the electric supply current at a reference potential side. By tapping a measurement signal on the supply voltage side of the solenoid valve, it is possible to identify short-circuits of the control coil.

SUMMARY OF THE INVENTION

It is an object of the invention to improve the monitoring of the solenoid valve.

The object may be achieved by way of the features described herein. Further developments are the subject matter of the further descriptions herein.

According to one aspect of the invention, a method for monitoring a solenoid valve having a control coil for controlling an air pressure in a brake cylinder of an electro-pneumatic brake, wherein the solenoid valve has a supply voltage side, at which the control coil takes up an electric supply current, and a reference potential side, at which the control coil delivers the electric supply current comprises the steps of applying or feeding in a test signal on one side of the solenoid valve, tapping a measurement signal on the other side of the solenoid valve, and determining the state of the solenoid valve based on a juxtaposition of the test signal and of the measurement signal.

The specified method is based on the consideration that, in the method mentioned at the beginning, monitoring takes place at the control coil only to check whether the supply current through the control coil also runs in a manner corresponding to the operating behavior of the control coil. This means that when the solenoid valve is switched on and hence the control coil is energized then the test signal has to have a value corresponding to the supply voltage and when the control coil is not energized then the test signal has to have a value corresponding to the reference potential— usually ground. However, the control coil cannot be monitored in a switched-off state because the reference potential does not change. It is also not possible to use the method mentioned at the beginning to determine interruptions or other technically incorrect impedance values of the control coil because these cannot be differentiated from operation of the control coil as intended.

This is where the specified method comes in with the proposal to apply a test signal on one side of the solenoid valve and on the other side of the solenoid valve to check whether the test signal is correctly received. Only when the test signal is transmitted from one side of the solenoid valve to the other side of the solenoid valve in a predetermined manner can a fault-free state of the control coil of the solenoid valve and hence of the solenoid valve be assumed. The solenoid valve can thus be monitored not only for a plurality of fault states; the monitoring also works when the control coil of the solenoid valve is in an unenergized and thus inactive operating state.

In principle, the test signal can be selected as desired, that is to say also independently of all the other signals in the brake having the solenoid valve. However, the test signal may be dependent on the control of the air pressure in the brake cylinder or even a control signal that serves to adjust the air pressure in the brake cylinder. In this way, the method can be implemented in an already present electro-pneumatic brake without further adjustments through pure observations and/or signal evaluations, in which control signals, which are suitable as test signals, are present.

In one development of the specified method, the test signal has a predetermined, temporally changing profile. The temporal profile is a further monitoring arrangement for the control coil, since the temporal profile has to be recovered in the test signal.

In this case, the temporal profile can be formed from a plurality of pulses. A pulse sequence of this kind can be generated in a simple manner using conventional pulse generators. In modern electro-pneumatic brakes, which are actuated by pulse width modulation, pulse sequences of this kind are present anyway.

In one technically particularly simple embodiment of the specified method, pulses in the measurement signal are counted over a predetermined period, wherein the juxtaposition comprises a comparison of the counted pulses in the measurement signal with a count value, which corresponds to a number of pulses in the test signal over the predetermined period. Although because the control coil changes the phase of the test signal with the pulses but not its frequency, the number of pulses from the test signal have to be recovered 1:1 in the measurement signal. However, irrespective of this criterion, an absence of the pulse sequence in the measurement signal or a continuously active measurement signal can be classified as a short-circuit or as an interruption depending on which side of the control coil the measurement signal is tapped.

In another development of the specified method, the control coil is connected in parallel with a supply-side voltage divider, wherein the measurement signal is tapped at an intermediate potential point of the supply-side voltage divider. By selecting the voltage divider in a manner depending on the application, the measurement signal and the test signal can be generated based on a comparatively high operating voltage for the solenoid valve of, for example, 24 V, and still be tapped by a sensitive evaluation circuit to which the comparatively low input voltages of, for example, 3 V, have to be applied.

In an additional development of the specified method, the control coil is connected in series with a reference-potential-side voltage divider, wherein the test signal is tapped at an intermediate potential point of the reference-potential-side voltage divider. When the reference potential is ground, this ensures that the test signal is not conducted directly to the reference potential without it triggering an effect at the supply side of the voltage divider and being able to be tapped there as measurement signal.

In one particular development of the specified method, a ratio between the voltage divider and the control coil is between 1:50 and 1:200, in particular between 1:75 and 1:150, particularly may be 1:100. Within these values, it is ensured that, in particular, the pulse-shaped test signal can be observed at an inactive test coil, which fundamentally greatly attenuates the test signal on account of its inductive property.

In a particular embodiment of the specified method, a further solenoid valve having a further control coil is provided, wherein the two solenoid valves are connected in series and the test signal is fed at an intermediate potential point between the two solenoid valves.

In this arrangement, the further solenoid valve can be concomitantly monitored particularly efficiently. To this end, a further measurement signal is tapped on the side of the further solenoid valve opposite the intermediate potential point and the state of the further solenoid valve can be determined based on a juxtaposition of the text signal and the further measurement signal. In this way, the two solenoid valves can be monitored using a single signal source for generating the test signal.

The arrangement mentioned above can be expanded by any number of further solenoid valves in a star shape.

According to a further aspect of the invention, a control apparatus is configured to carry out a method as claimed in one of the preceding claims.

In one development of the specified control apparatus, the specified apparatus has a memory and a processor. In this case, the specified method is stored in the memory in the form of a computer program and the processor is provided to execute the method when the computer program is loaded from the memory into the processor.

According to a further aspect of the invention, a computer program comprises a program code arrangement in order to carry out all the steps of one of the specified methods when the computer program is executed on a computer or one of the specified apparatuses.

According to a further aspect of the invention, a computer program product contains a program code, which is stored on a computer-readable data storage arrangement and which carries out one of the specified methods when it is executed on a data processing device.

According to another aspect of the invention, an electro-pneumatic brake comprises a brake cylinder that can be filled with compressed air for actuating a brake actuator, a compressed air source for filling the brake cylinder, a solenoid valve for targeted application of compressed air from the compressed air source to the brake cylinder and one of the specified apparatuses for monitoring the state of the solenoid valve.

According to another aspect of the invention, a vehicle, in particular a commercial vehicle, such as a semitrailer tractor, comprises one of the specified control apparatuses and/or the specified electro-pneumatic brake.

In the following text, the invention is explained in more detail with reference to exemplary embodiments in connection with the drawings.

In the figures, identical technical elements are provided with the same reference signs and are described only once.

BRIEF DESCRIPTION OF THE DRAWINGS

FIGS. 3a to 5 show structural diagrams of monitoring apparatuses for monitoring the solenoid valves in the brake installation of the vehicle from FIG. 1 having the circuit from FIG. 2.

DETAILED DESCRIPTION

Figure 1:
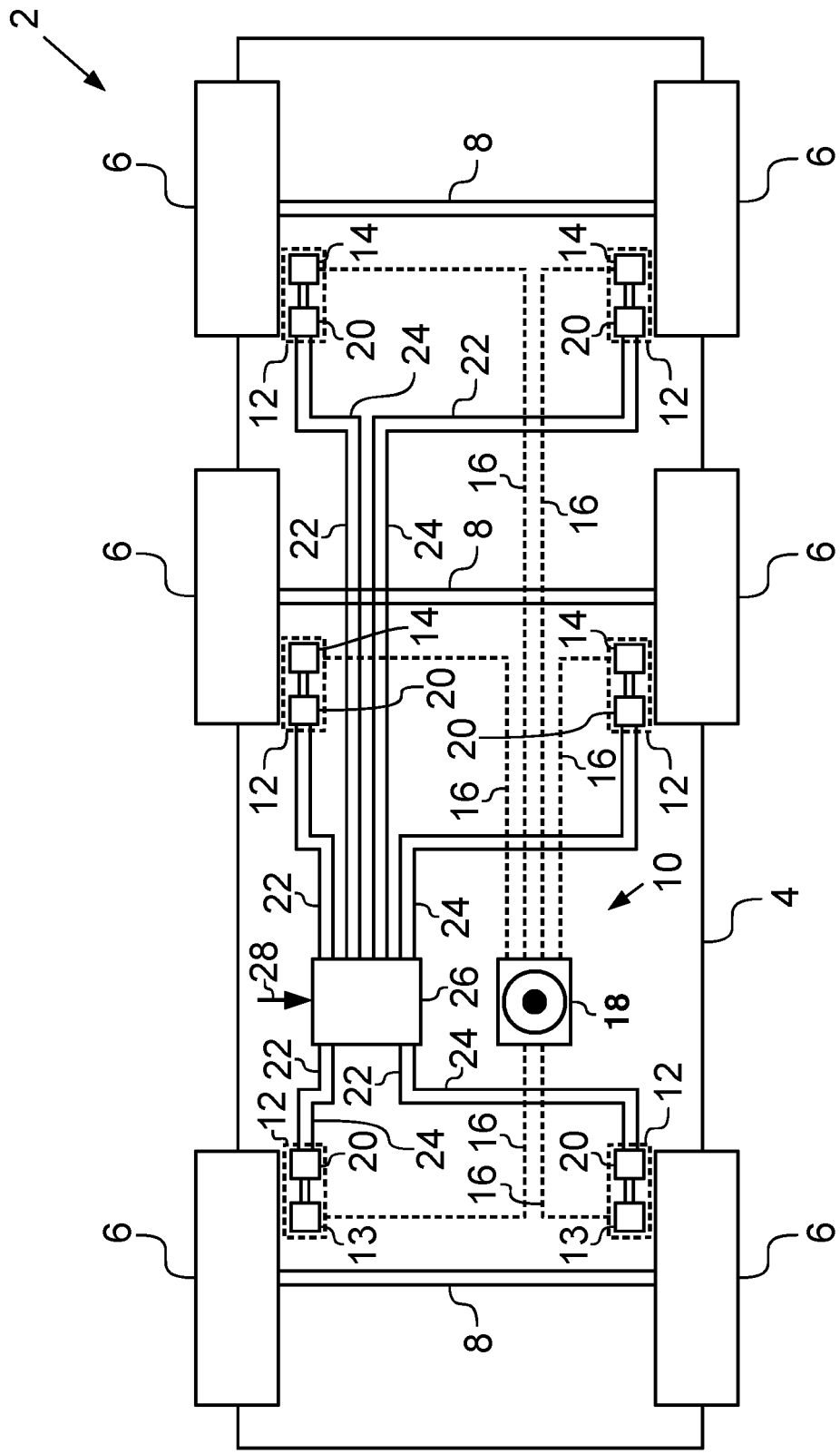
FIG. 1 shows a schematic view of a vehicle having a brake installation.

FIG. 1 schematically shows a vehicle in the form of a commercial vehicle embodied as a semitrailer tractor 2. The semitrailer tractor 2 has a chassis 4 on which wheels 6 are borne rotatably by axles 8. The wheels 6 are driven individually or all together by a drive system (not illustrated further) for moving the semitrailer tractor 2. Drive systems of this kind are known very well and are not intended to be outlined further below.

In order to brake the traveling semitrailer tractor 2 during operation (operating brake effect) or in order to keep the semitrailer tractor 2 at a standstill (locked effect) so that the semitrailer tractor does not move unintentionally, a brake system 10 is arranged on the semitrailer tractor. The brake system 10 comprises a brake 12 on each wheel 6, which brake is arranged on the chassis 4 in a manner spatially fixed with respect to the respective wheel 6.

Each brake 12 has a brake actuator (not illustrated further), which engages into its correspondingly associated wheel 6, blocks the wheel and can thus prevent rotation of the wheel 6 with respect to the chassis 4. The brake actuators (not shown) of the brake cylinders 13, which have only an operating brake effect in the semitrailer tractor 2, are moved on the front axle 8. In contrast, the brake actuators are moved on the rear axles 8 with what are known as combination brake cylinders 14, which can have both an operating brake effect and a locked brake effect in the semitrailer tractor 2. Brake cylinders of this kind are known very well and are not intended to be described further below. All of the brake cylinders 13, 14 are filled with compressed air, which is drawn from a compressed air source 18, in pneumatic fashion by compressed air lines 16, which are illustrated in FIG. 1 using dashes. The functioning of brakes of this kind is known very well and is not intended to be outlined further below.

To control the air pressure in the brake cylinders 13, 14, each brake 12 comprises a solenoid valve 20, which can adjust an air pressure in the respective brake cylinder 13, 14 by adjusting the degree of opening of an inlet opening (not shown further) between the respective compressed air line 16 in the respective brake cylinder 13, 14.

The individual solenoid valves 20 are actuated electrically. On account of the combination of the electrically actuated solenoid valves 20 and the pneumatically operated brake cylinders 13, 14, the brakes 12 are referred to as electro-pneumatic, as already mentioned.

For actuation, each solenoid valve 20 is energized from a supply-voltage-side control line 22 and a reference-potential-side control line 24 by way of a control apparatus 26. The control apparatus 26 can be configured fundamentally according to DE 195 13 621 B4, which can be used to jointly actuate the plurality of solenoid valves 20 based on a braking demand 28 by the control lines 22, 24.

This is intended to be explained in more detail below in a very highly simplified manner with reference to FIG. 2, which shows a part of the control apparatus 26, which actuates the solenoid valves 20 of two brakes 12 at one of the axles 8 in the semitrailer tractor 2. For details regarding the operation of operating brakes and locking brakes in semitrailer tractors, reference is made to the relevant literature.

The two solenoid valves 20 are interconnected in the control apparatus 26 by the control lines 22, 24 in a T-shaped manner between a supply voltage line 30 and a reference potential 32 in the form of ground, wherein the T point 33 is pointed on the side of the reference potential 32.

The supply-voltage-side control lines 22 can be interrupted individually using in each case a cascade connection composed of a bipolar NPN preamplifier transistor 34 and a circuit breaker 36 in the form of a P-channel MOSFET. Provided that the reference-potential-side control lines 24 are likewise conducting, the wheels 6 can be braked individually as a result of this in order to realize driving dynamics controls, for example. In this case, an individual control voltage 38 is applied to the respective preamplifier transistor 34 from a corresponding driving dynamics controller (not shown), which individual control voltage then in turn actuates the respective circuit breaker 36. In this way, the corresponding supply-voltage-side control line 22 is interrupted and the supply voltage line 30 is isolated from the corresponding solenoid valve 20.

On the side of the reference potential 32, a common control switch 40 in the form of an N-channel MOSFET is arranged before the T point 33 as seen from the reference potential 32. The reference-potential-side control lines 24 that are interconnected in a T-shaped manner can all be closed jointly using the common control switch 40. Provided that the supply-voltage-side control lines 22 are all closed, the solenoid valves 20 that are interconnected in the T-circuit can in this way be applied jointly to the reference potential 32.

The common control switch 40 is controlled using a voltage source 41, which applies a control voltage 42 in the form of a pulse width modulation signal 43, subsequently called PWM signal 43, to the common control switch 41 based on the braking demand 28.

Each solenoid valve 20 contains a control coil 44, which is energized by the control lines 22, 24 when both the corresponding individual circuit breaker 36 and the common control switch 40 are connected in the manner mentioned above. The respective control coil 44 establishes a magnetic field in a manner known per se, which magnetic field is dependent on the pulse width of the PWM signal 43. Using the magnetic field, the respective control coil 44 adjusts in a manner known per se the degree of opening of the respective compressed air line 16 leading to the brake 12 in order to adjust the level of the brake pressure of the brake 12.

Although the control apparatus 26 has been described having reference-potential-side control lines 24 branching in a T shape, the branching can be as desired, in particular as desired in a star shape, as is known from DE 10 2008 060 720 B3, for example. For example, all the brakes 12 of the two rear axles 8 of the semitrailer tractor 2 could thus be actuated by a common control switch 40.

For reasons of safety, it is necessary to monitor the fault-free function of the solenoid valves 20 and the control coils 44 contained therein. To this end, WO 2001/066 397 A1 already proposes to monitor the potential of a supply-voltage-side control line 22. In this way, short-circuits in the respective control coil 44 can be identified when the potential on the supply-voltage-side control line 22 is equal to or close to the reference potential 32 despite closed switches 36, 40. In another state combination of the switches 36, 40, it is not possible to monitor for faults. An interruption in the respective control coil 44 cannot be identified either.

This is where the present embodiment comes in with the proposal to apply or to feed in a test signal to the circuit either on the side of the supply voltage line 30 or on the side of the reference potential 32 and to tap the test signal on the respectively opposite side of one of the control coils 44 as a measurement signal. In order to keep the circuitry outlay as low as possible, the control voltage 42 at the common control switch 40 is used as the test signal on the side of the reference potential 32 at the common T point.

The measurement signal is measured at voltage dividers 54 by various tapping points 52 in the control apparatus 26, which voltage dividers are interconnected between the respective tapping points 52 and the reference potential 32. Each voltage divider 54 contains a supply-voltage-side resistor 56 and a reference-potential-side resistor 58, which are in turn each connected to one another by an intermediate potential point 60.

Figure 2:
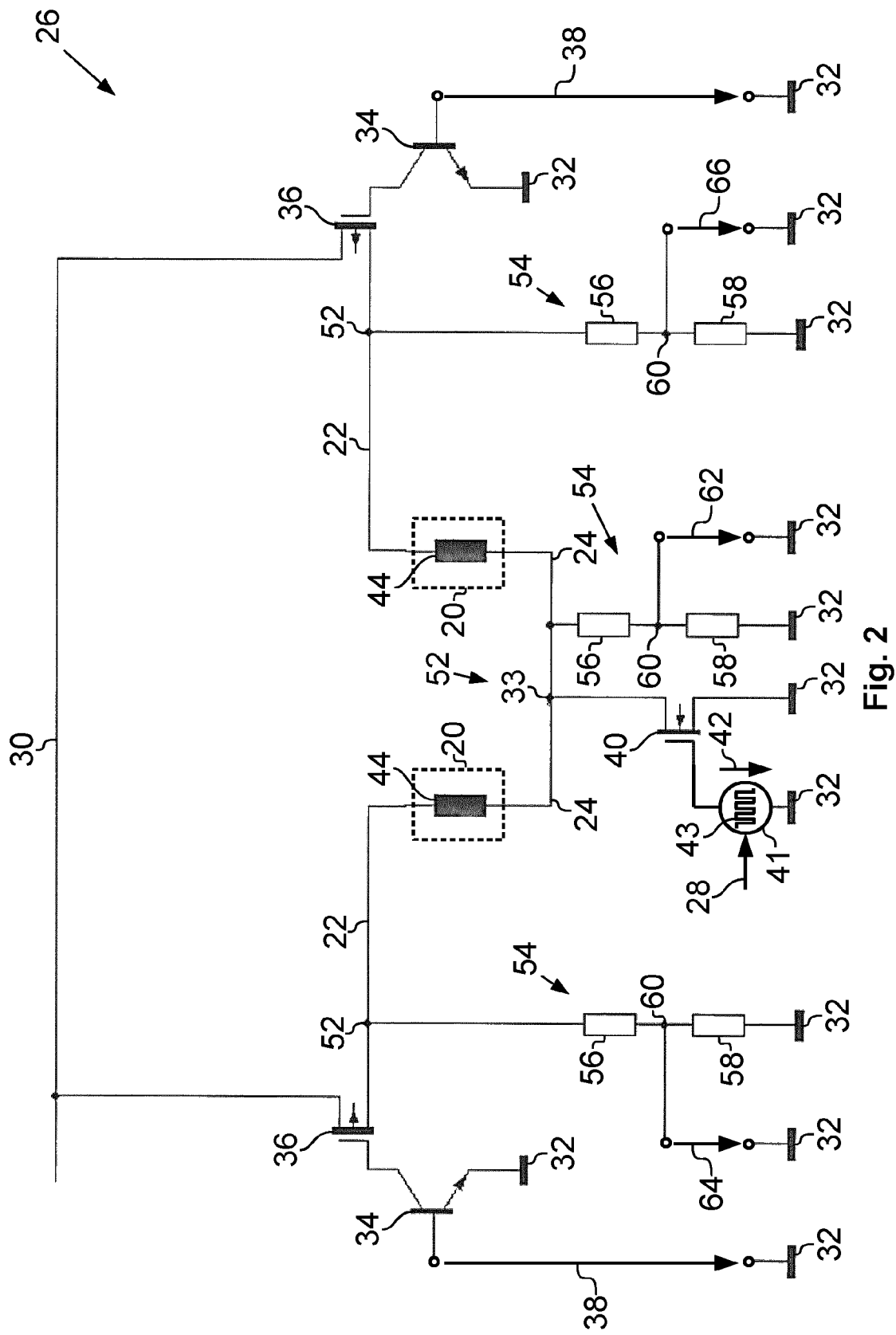
FIG. 2 shows a schematic view of a circuit for actuating solenoid valves in the brake installation of the vehicle from FIG. 1.

In the circuit shown in FIG. 2, one of the voltage dividers 54 is interconnected at the T point 33 on the side of the reference potential 32. The T point 33 therefore serves simultaneously as tapping point 52. A first measurement signal 62 is measured at the intermediate potential point 60 of the voltage divider 54. A second voltage divider 54 is interconnected on the side of the supply voltage line 30 in parallel with one of the solenoid valves 20 between the solenoid valve and the circuit breaker 36 thereof, whereas a third voltage divider 54 is interconnected in a corresponding manner in parallel with the other of the solenoid valves 20. A second measurement signal 64 and a third measurement signal 66 are correspondingly measured at the intermediate potential point 60 of the voltage dividers 54.

The measured measurement signals 62 to 66 can now be evaluated in the manner described below to monitor the solenoid valves 20 and the control coils 44 contained therein. This is intended to be explained in more detail below with reference to FIGS. 3a to 5c.

Using the structural circuit diagram of FIG. 3a, during the operation of a brake 12, and hence during an active braking demand 28, it is possible to monitor whether the solenoid valves 20 on the side of the supply voltage line 30 have a short-circuit with respect to the reference potential 32, which short-circuit bypasses the circuit breaker 36.

To this end, a low-pass 68 is used to filter the PWM signal 43 out of the second measurement signal 64 or the third measurement signal 66 and to feed the PWM signal to a negation input 70 of an AND element 72. The braking demand 28 is applied to the AND element 72 at the same time. If the low-pass-filtered second measurement signal 64 or the lowpass-filtered third measurement signal 66 now remain inactive despite an active braking demand 28, this means that the potential of the corresponding tapping points 52 is equal to the reference potential 32, even though an operating potential would be expected on account of an actually flowing current. The corresponding tapping point 52 therefore has to be short-circuited with respect to the reference potential 32. In this case, two positive signals are applied at the AND element 72 on account of the negated and filtered measurement signal 64, 66 and a corresponding reference-potential short-circuit message 74 is output.

Using the structural circuit diagram of FIG. 3b, during operation of a brake 12, and hence during an active braking demand 28, it is possible to monitor whether the control coils 44 of the solenoid valves 20 have an interruption.

To this end, a low-pass 68 is used to filter the PWM signal 43 out of the first measurement signal 62 and to feed the PWM signal to a negation input 70 of an AND element 72. The braking demand 28 is applied to the AND element 72 at the same time. If the low-pass-filtered first measurement signal 62 now remains inactive despite an active braking demand 28, this means that the potential of the T point 33 is equal to the reference potential 32, even though a voltage would have to be dropped across the voltage divider 54 and therefore another potential would be expected on account of an actually flowing current. It can therefore be assumed that no current is flowing and the control coils 44 of the solenoid valves 20 have an interruption. In this case, two positive signals are applied at the AND element 72 on account of the negated and filtered first measurement signal 62 and a corresponding interruption message 76 is output. However, the interruption signal is not unambiguous, since it could also be a short-circuit between the output from one of the solenoid valves 20 on the side of the reference potential 32 and the reference potential 32, which short-circuit bypasses the control switch 40. However, it is not possible to detect which faults are also involved here using the method in WO 2001/066 397 A1.

Using the structural circuit diagram of FIG. 3c, during the operation of a brake 12, and hence during an active braking demand 28, it is possible to monitor whether the output of a control coil 44 of the solenoid valves 20 on the side of the reference potential 32 has a short-circuit with respect to the supply voltage line 30.

To this end, a low-pass 68 is used to filter the PWM signal 43 out of the first measurement signal 62 and to feed the PWM signal to an AND element 72. The braking demand 28 is applied to the AND element 72 at the same time. If the lowpass-filtered first measurement signal 62 now remains active despite an active braking demand 28, this means that the potential of the T point 33 is equal to the potential of the supply voltage line 30, even though the electrical potential would have to be lower on account of a current actually flowing through the control coils 44. It can therefore be assumed that the corresponding output of the solenoid valve 20 is connected to the supply line 30 and a corresponding short-circuit is present. In this case, two positive signals are applied at the AND element 72 and a corresponding supply-voltage short-circuit message 78 is output. This fault case cannot be detected using the method in WO 2001/066 397 A1 either.

Figure 4:
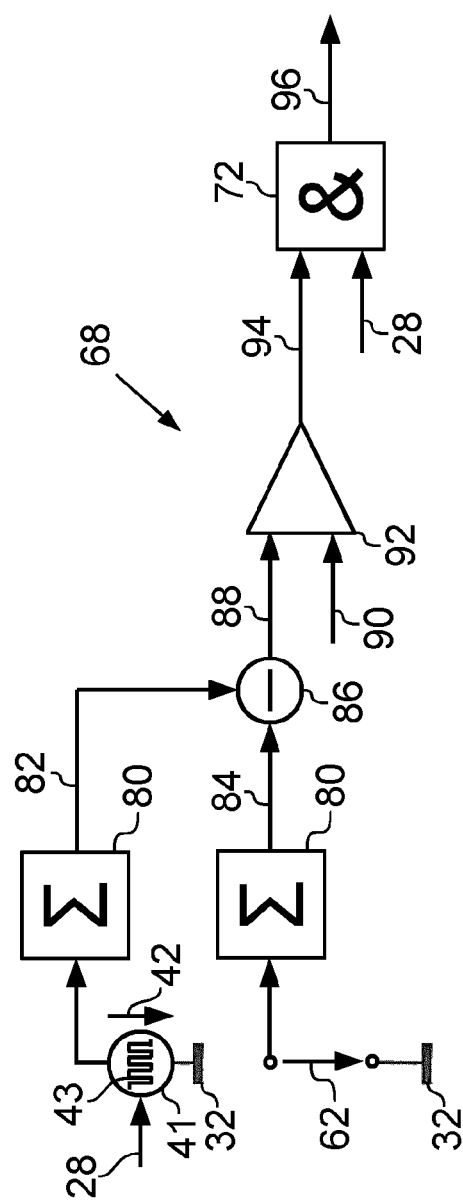

In order to monitor the output of the solenoid valves 20 on the side of the reference potential 32 for further faults, but which cannot be specified further, as shown in FIG. 4, the control signal 42 is additionally juxtaposed with the first measurement signal 62 in the manner described below.

During fault-free operation of the brake 12, the frequency of the control signal 42 has to be transferred to the voltage dividers 54 unchanged by virtue of the first measurement signal 62 being tapped, because no frequency-filtering and/or frequency-attenuating components are present on this path. The frequency 82 of the control signal 42 and the frequency 84 of the first measurement signal 62 are therefore determined in accumulators 80. A frequency difference 88 between the two frequencies 82, 84 is then determined using a subtractor 86. When the frequency difference exceeds a determined limit 90, a comparator 92 outputs a deviation signal 94. The deviation signal 94 is converted to a general fault signal 96 using an AND element 72 when the deviation signal 94 arises despite a present braking demand, since in this case the aforementioned condition has to be met for fault-free operation of the brake 12.

In the same way, as described with reference to FIG. 4, a control coil 44 of a solenoid valve 20, which is inactive due to a closed circuit breaker 34, can also be monitored. In this case, the frequency 82 of the control voltage 42 is transmitted to the corresponding voltage divider 54, which parallel with the inactive solenoid valve 20, because although the control coil 44 of the inactive solenoid valve 20 has a signal-attenuating effect, it does not have a frequency-changing effect. By suitably selecting a ratio between the two resistors 56, 58 of the corresponding voltage divider 54 and of the control coil 44, the effect of the signal-attenuating control coil 44 can be reduced here. In some tests, it has been shown that a ratio of 1:100 between the total resistance of the resistors 56, 58 of the voltage divider 54 and the inductance of the corresponding control coil 44 may be optimal. However, this ratio has to be adjusted in any case depending on the application.

Figure 5:
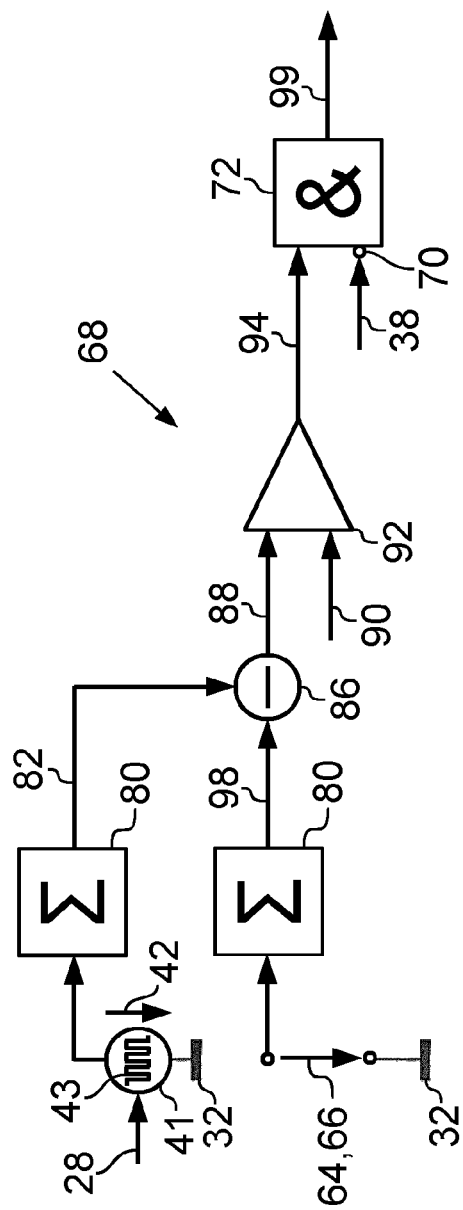

Using the structural circuit diagram of FIG. 5, the state of an inactive solenoid valve 20 and the control coil 44 thereof can be monitored. The effect is analogous to the structural circuit diagram of FIG. 4, wherein, however, it is not the frequency 84 of the first measurement signal 62 that is determined but the frequency 98 of the second measurement signal 64 or third measurement signal 66, depending on which inactive solenoid valve 20 is intended to be monitored. When the comparator 92 in FIG. 5 outputs a deviation signal 94, the AND element 72 outputs a coil fault signal 99 in the case of a switched-off corresponding individual control signal 38, which coil fault signal indicates a fault in the control coil 44 of the inactive solenoid valve 20 that cannot be identified further. In order to specify this fault further, the potential at the corresponding tapping point 52 could also be examined analogously to FIGS. 3b and 3c. In any case, the fault case of FIG. 5 cannot be detected using the method in WO 2001/066 397 A1 either.

In FIG. 5, a switched-off individual control signal 38 is at the AND element 72 condition that the coil fault signal 99 is output. This is necessary since, in the case of a switched-on individual control signal 38, the corresponding tapping point 52 on the side of the supply voltage line 30 is permanently at the potential thereof and a frequency cannot be measured there despite fault-free operation and present control signal 42 at the control switch 40.

When an independent test signal is actively fed into the circuit of FIG. 2 as the test signal instead of the control signal 42, it is then also possible to manage without the condition that the individual control signal 38 has to be inactive.

THE LIST OF REFERENCE NUMERALS IS AS FOLLOWS 1
2 Semitrailer tractor
3
4 Chassis
6 Wheel
8 Front and rear axles
10 Brake system
12 Brake
13 Brake cylinder
14 Combination brake cylinder
16 Compressed air lines
18 Compressed air source
20 Solenoid valves
22 Control line
24 Control line
26 Control apparatus
28 Braking demand
30 Supply voltage line
32 Reference potential
33 T point
34 Preamplifier transistor
36 Circuit breaker
38 Control voltage
40 Control switch 41 Voltage source
42 Test signal
43 Pulse width modulation signal
44 Control coil
52 Tapping points
54 Voltage dividers
56 Supply-voltage-side resistor
58 Reference-potential-side resistor
60 Intermediate potential point
62 First measurement signal
64 Second measurement signal
66 Third measurement signal
68 Low-pass
70 Negation input
72 AND element
74 Reference-potential short-circuit message
76 Interruption message
78 Supply-voltage short-circuit message
80 Accumulation
82 Frequency
84 Frequency
86 Subtractor
88 Frequency difference
90 Limit
92 Comparator
94 Deviation signal
96 Fault signal
99 Coil fault signal

The invention claimed is:

1. A method for monitoring a solenoid valve, the method comprising:
applying a test signal on one side of the solenoid valve, the solenoid valve having a control coil for controlling an air pressure in a brake cylinder of an electropneumatic brake, wherein the solenoid valve has a supply voltage side, at which the control coil takes up an electric supply current, and a reference potential side, at which the control coil delivers the electric supply current;
tapping a measurement signal on the other side of the solenoid valve; and
determining the state of the solenoid valve based on a juxtaposition of the test signal and of the measurement signal;
wherein one of the following is satisfied: (i) the control coil is connected in parallel with a supply-side voltage divider and the measurement signal is tapped at an intermediate potential point of the supply-side voltage divider, or (ii) the control coil is connected in series with a reference-potential-side voltage divider and the test signal is applied at an intermediate potential point of the reference-potential-side voltage divider.

2. The method of claim 1, wherein the test signal is dependent on the control of the air pressure in the brake cylinder.

3. The method of claim 1, wherein the test signal has a predetermined, temporally changing profile.

4. The method of claim 3, wherein the temporal profile is formed from a plurality of pulses.

5. The method of claim 4, further comprising:
counting pulses in the measurement signal over a predetermined period, wherein a juxtaposition includes a comparison of the counted pulses in the measurement signal with a count value, which corresponds to a number of pulses in the test signal over the predetermined period.

6. The method of claim 1, wherein (i) is satisfied so that the control coil is connected in parallel with the supply-side voltage divider and the measurement signal is tapped at the intermediate potential point of the supply-side voltage divider.

7. The method of claim 1, wherein (ii) is satisfied so that the control coil is connected in series with the reference-potential-side voltage divider and the test signal is applied at the intermediate potential point of the reference-potential-side voltage divider.

8. The method of claim 6, wherein a ratio between the total resistance of the voltage divider and the inductance of the control coil is between 1:50 and 1:200.

9. A method for monitoring a solenoid valve, the method comprising:
applying a test signal on one side of the solenoid valve, the solenoid valve having a control coil for controlling an air pressure in a brake cylinder of an electropneumatic brake, wherein the solenoid valve has a supply voltage side, at which the control coil takes up an electric supply current, and a reference potential side, at which the control coil delivers the electric supply current;
tapping a measurement signal on the other side of the solenoid valve; and
determining the state of the solenoid valve based on a juxtaposition of the test signal and of the measurement signal;
wherein there is a further solenoid valve having a further control coil, and wherein the solenoid valve and the further solenoid valve are connected in series and the test signal is applied at an intermediate potential point between the solenoid valves.

10. The method of claim 9, further comprising:
tapping a further measurement signal on the side of the further solenoid valve opposite the intermediate potential point; and
determining the state of the further solenoid valve based on a juxtaposition of the test signal and of the further measurement signal.

11. A control apparatus for monitoring a solenoid valve, comprising:
a control unit configured to perform the following:
applying a test signal on one side of the solenoid valve, the solenoid valve having a control coil for controlling an air pressure in a brake cylinder of an electropneumatic brake, wherein the solenoid valve has a supply voltage side, at which the control coil takes up an electric supply current, and a reference potential side, at which the control coil delivers the electric supply current;
tapping a measurement signal on the other side of the solenoid valve; and
determining the state of the solenoid valve based on a juxtaposition of the test signal and of the measurement signal;
wherein one of the following is satisfied: (i) the control coil is connected in parallel with a supply-side voltage divider and the measurement signal is tapped at an intermediate potential point of the supply-side voltage divider, or (ii) the control coil is connected in series with a reference-potential-side voltage divider and the test signal is applied at an intermediate potential point of the reference-potential-side voltage divider.

12. An electropneumatic brake, comprising:
a brake cylinder that can be filled with compressed air for actuating a brake actuator;
a compressed air source for filling the brake cylinder;
a solenoid valve for targeted application of compressed air from the compressed air source to the brake cylinder; and
a control apparatus for monitoring the state of the solenoid valve;
wherein the control includes a control unit configured to perform the following:
applying a test signal on one side of the solenoid valve, the solenoid valve having a control coil for controlling an air pressure in a brake cylinder of an electropneumatic brake, wherein the solenoid valve has a supply voltage side, at which the control coil takes up an electric supply current, and a reference potential side, at which the control coil delivers the electric supply current;
tapping a measurement signal on the other side of the solenoid valve; and
determining the state of the solenoid valve based on a juxtaposition of the test signal and of the measurement signal;
wherein one of the following is satisfied: (i) the control coil is connected in parallel with a supply-side voltage divider and the measurement signal is tapped at an intermediate potential point of the supply-side voltage divider, or (ii) the control coil is connected in series with a reference-potential-side voltage divider and the test signal is applied at an intermediate potential point of the reference-potential-side voltage divider.

13. A non-transitory computer readable medium having a computer program, which is executable by a processor, comprising:
a program code arrangement having program code for monitoring a solenoid valve, by performing the following:
applying a test signal on one side of the solenoid valve, the solenoid valve having a control coil for controlling an air pressure in a brake cylinder of an electropneumatic brake, wherein the solenoid valve has a supply voltage side, at which the control coil takes up an electric supply current, and a reference potential side, at which the control coil delivers the electric supply current;
tapping a measurement signal on the other side of the solenoid valve; and
determining the state of the solenoid valve based on a juxtaposition of the test signal and of the measurement signal;
wherein one of the following is satisfied: (i) the control coil is connected in parallel with a supply-side voltage divider and the measurement signal is tapped at an intermediate potential point of the supply-side voltage divider, or (ii) the control coil is connected in series with a reference-potential-side voltage divider and the test signal is applied at an intermediate potential point of the reference-potential-side voltage divider.

14. The method of claim 6, wherein a ratio between the total resistance of the voltage divider and the inductance of the control coil is between 1:75 and 1:150.

15. The method of claim 6, wherein a ratio between the total resistance of the voltage divider and the inductance of the control coil is 1:100.

* * * * *